United States Patent
Kim et al.

(10) Patent No.: US 8,005,427 B2
(45) Date of Patent: Aug. 23, 2011

(54) APPARATUS AND METHOD FOR EXCHANGING ACTIVE PROFILE IN BLUETOOTH COMMUNICATION SYSTEM

(75) Inventors: Joon-Woo Kim, Daegu (KR); Youn-Seog Chang, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 865 days.

(21) Appl. No.: 12/004,704

(22) Filed: Dec. 21, 2007

(65) Prior Publication Data

US 2008/0214110 A1   Sep. 4, 2008

(30) Foreign Application Priority Data

Dec. 22, 2006 (KR) .......................... 10-2006-0132503

(51) Int. Cl.
*H04B 7/00* (2006.01)

(52) U.S. Cl. ....................................... 455/41.2; 709/230

(58) Field of Classification Search .................. 455/41.2, 455/41.3, 517, 518, 519; 709/230
See application file for complete search history.

(56) References Cited

U.S. PATENT DOCUMENTS

2005/0220139 A1 * 10/2005 Aholainen ................ 370/466
2005/0278646 A1 * 12/2005 Liscano et al. ............ 715/762

* cited by examiner

*Primary Examiner* — Lewis G West

(57) ABSTRACT

An active profile exchange in a Bluetooth communication system is provided. A method for exchanging a profile of a server device in the Bluetooth communication system includes receiving a request for a service support list from a client device; when there is no adequate profile for the client device, generating and transmitting a service support list including information informing that an active profile generation is possible in response to the request; after providing the service support list, receiving the active profile generated by the client device when the client device requests an active profile exchange; and operating according to the active profile generated by the client device.

24 Claims, 8 Drawing Sheets

APPARATUS AND METHOD FOR EXCHANGING ACTIVE PROFILE IN BLUETOOTH COMMUNICATION SYSTEM

CROSS-REFERENCE TO RELATED APPLICATION(S) AND CLAIM OF PRIORITY

This application claims priority under 35 U.S.C. §119(a) to an application filed in the Korean Intellectual Property Office on Dec. 22, 2006 and assigned Serial No. 2006-132503, the disclosure of which is herein incorporated by reference.

TECHNICAL FIELD OF THE INVENTION

The present invention relates generally to an apparatus and a method for exchanging an active profile in a Bluetooth communication system. More particularly, the present invention relates to an apparatus and a method for maximizing compatibility of Bluetooth devices by exchanging a suitable profile when there is no profile information for supporting a Bluetooth service in the Bluetooth communication system.

BACKGROUND OF THE INVENTION

The Bluetooth protocol, which is a kind of short distance communication protocol, was originally developed to convert a wired connection to a wireless connection for signal and data transmissions between specific devices.

FIG. 1 depicts a message flow of a general Bluetooth service discovery procedure.

A server device 110 in FIG. 1 is a Bluetooth device for providing a service available to another Bluetooth device, and a client device 120 uses the service.

Using a Service Discovery Protocol (SDP), the Bluetooth devices 110 and 120 are able to acquire a service list of the other Bluetooth device and acquire services provided through a service search procedure using the SDP.

More specifically, the client device 110 sends a service support list request message to the server device 120 in step A) and requests a profile of its intended service to the server device 120. The server device 120 responds to the client device 110 with a service support list response message including the request result in step B). When any one of the two devices 110 and 120 communicating with the other does not have its profile (the service protocol), it fails to perform the corresponding service.

FIG. 2 depicts a general Bluetooth protocol stack structure.

In a Bluetooth device, the Bluetooth protocol stack structure of FIG. 2 receives and processes a signal or data from a lower physical layer, and exchanges the processed signal or data with an application program. The application program receives a certain direction from a user through a user interface or output a certain result.

The Bluetooth protocol stack holds a profile list which defines functions provided in the Bluetooth protocol. If necessary, the profile list is provided to the other device.

If no profile is present for a specific service, a Bluetooth device cannot receive or provide the corresponding service. If there is no definite standard for detailed error occasions or only necessary functions of the corresponding profile are realized, even a device that provides the same service profile is highly likely to suffer error because optional or additional functions of the corresponding profile are not realized.

SUMMARY OF THE INVENTION

To address the above-discussed deficiencies of the prior art, it is a primary object of the present invention is to substantially solve at least the above problems and/or disadvantages and to provide at least the advantages below. Accordingly, an aspect of the present invention is to provide an apparatus and a method for exchanging an active profile in a Bluetooth communication system.

Another aspect of the present invention is to provide an apparatus and a method for providing services between Bluetooth devices even when there is no available profile between the Bluetooth devices in a Bluetooth communication system.

A further aspect of the present invention is to provide an apparatus and a method for providing services between Bluetooth devices by providing an executable active profile even when there is no available profile between the Bluetooth devices in a Bluetooth communication system.

The above aspects are achieved by providing a method for exchanging a profile of a server device in a Bluetooth communication system. The method includes receiving a request for a service support list from a client device; if there is no adequate profile for the client device, generating and transmitting a service support list including information informing that an active profile generation is possible in response to the request; after providing the service support list, receiving the active profile generated by the client device when the client device requests an active profile exchange; and operating according to the active profile generated by the client device.

According to one aspect of the present invention, a method for exchanging a profile of a client device in a Bluetooth communication system includes requesting a service support list to a server device; receiving the service support list from the server device in response to the request; requesting an active profile exchange to the server device when the service support list includes information informing that an active profile generation is possible; after requesting, generating and transmitting an adequate active profile to the server device; and operating according to the adequate active profile.

According to another aspect of the present invention, a server device for exchanging an active profile in a Bluetooth communication system includes a communication module for communication with another node; a profile manager for receiving a request for a service support list from a client device through the communication module, generating and transmitting the service support list including information informing that an active profile generation is possible in response to the request when there is no adequate profile for the client device, receiving an active profile generated by the client device when the client device requests an active profile exchange, and operating according to the active profile generated by the client device; and a storage for storing the active profile.

According to yet another aspect of the present invention, a client device for exchanging an active profile in a Bluetooth communication system includes a communication module for communication with another node; a profile manager for requesting a service support list to a server device through the communication module, receiving a response of the request, requesting an active profile exchange to the server device when the received service support list includes information informing that an active profile generation is possible, generating and transmitting an adequate active profile to the server device, and operating according to the adequate active profile; and a storage for storing the active profile.

According to still another aspect of the present invention, a system for exchanging an active profile in a Bluetooth communication system includes a client device for requesting a service support list, receiving a response of the request, requesting an active profile exchange and generating and transmitting an adequate active profile when the received service support list includes information informing that an active profile generation is possible, and operating according to the adequate active profile; and a server device for receiving the request for the service support list from the client device, generating and transmitting the service support list including information informing that an active profile generation is possible in response to the request when there is no adequate profile for the client device, receiving the active profile generated by the client device when the client device requests the active profile exchange, and operating according to the active profile generated by the client device.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 2 through 8, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system.

The present invention provides an apparatus and method for exchanging an active profile in a Bluetooth communication system.

Figure 3:
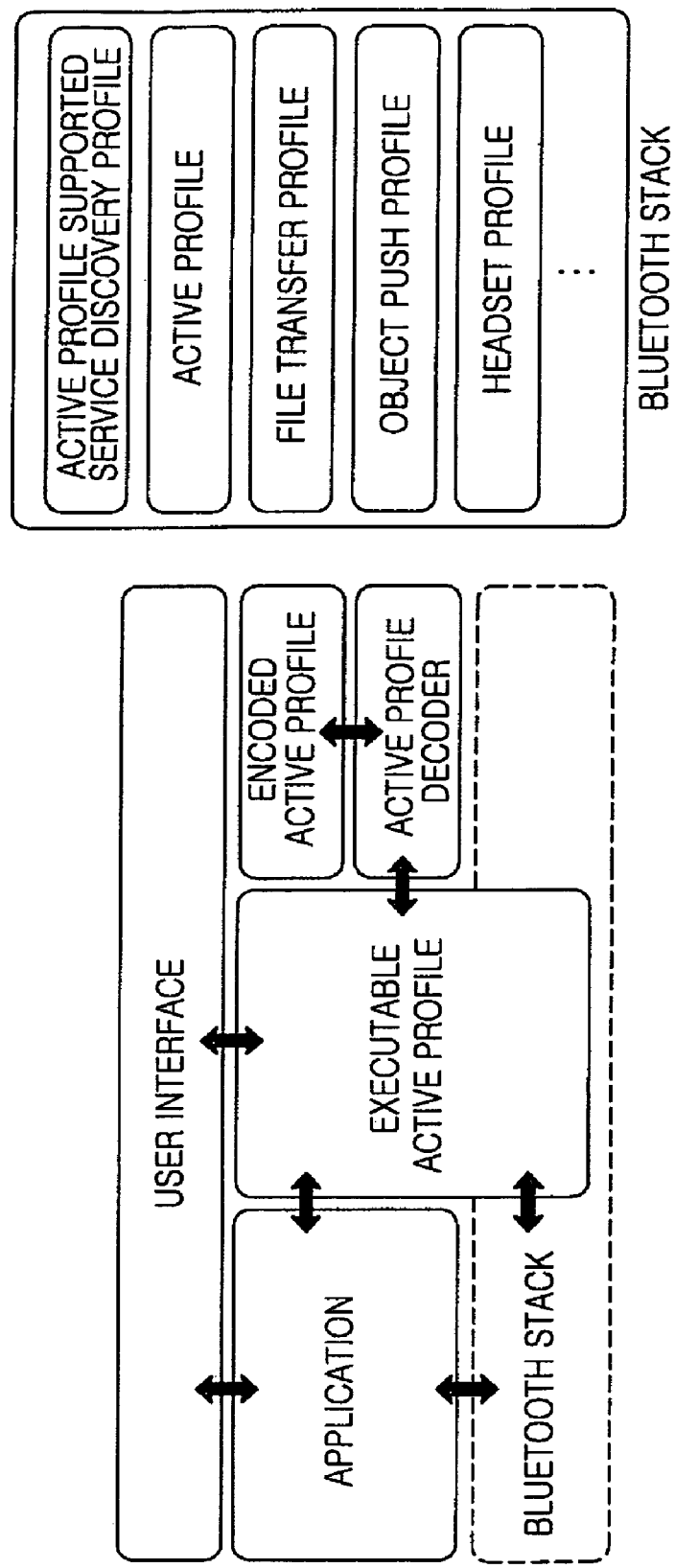
FIG. 3 is a diagram of a Bluetooth protocol stack structure according to an exemplary embodiment of the present invention.

FIG. 3 depicts a Bluetooth protocol stack structure according to an exemplary embodiment of the present invention.

Figure 1:
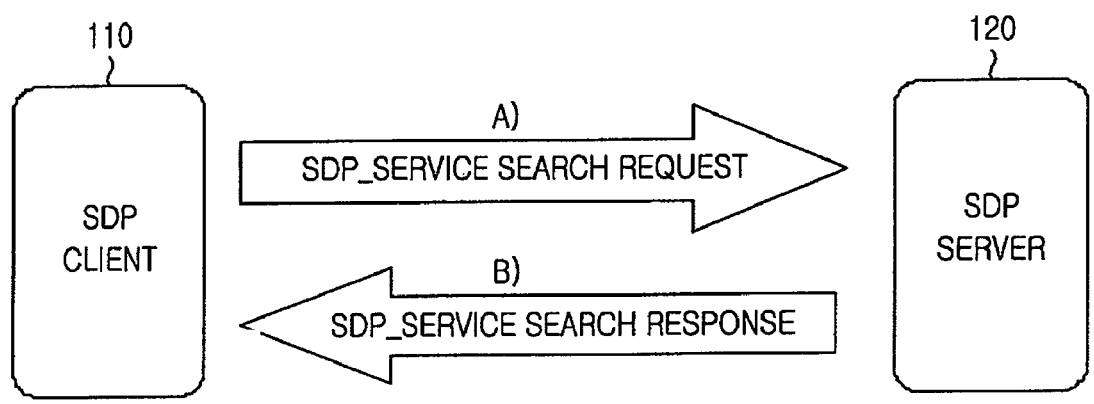
FIG. 1 is a message flow of a general Bluetooth service discovery process.
Figure 2:
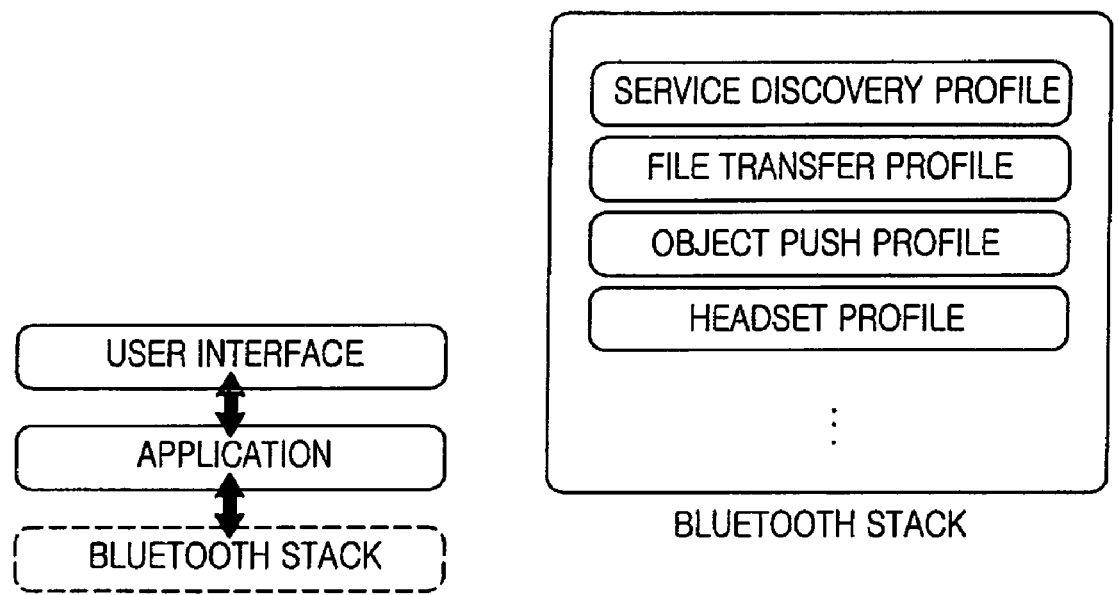
FIG. 2 is a diagram of a general Bluetooth protocol stack structure.

The Bluetooth protocol stack structure of FIG. 3 includes an encoded active profile, an active profile decoder, and an executable active profile, which are additionally executable compared to the structure of FIG. 1. The active provide decoder decodes an encoded profile provided from the encoded active profile to an executable active profile and outputs the executable active profile.

A service discovery profile recognizes the parts. The service discovery profile belongs to the Bluetooth protocol stack.

Figure 4:
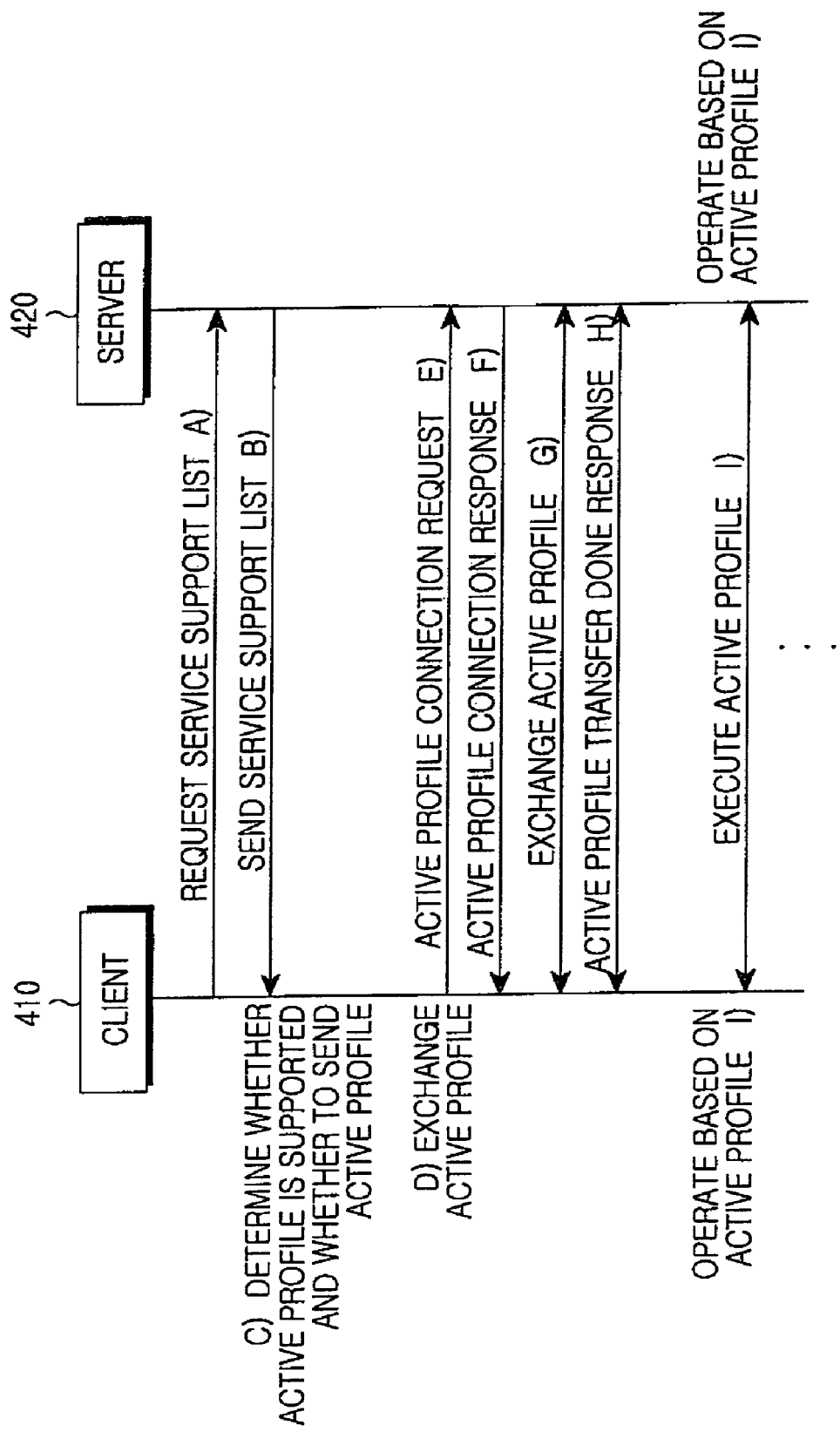
FIG. 4 is a diagram of an active protocol exchange procedure according to an exemplary embodiment of the present invention.

FIG. 4 illustrates an active protocol exchange procedure according to an exemplary embodiment of the present invention.

In FIG. 4, when a client device 410 sends a service support list request message SDP_ServiceSearchRequest to a server device 420 to request a supportable profile list in step A), the server device 420 responds with a service support list response message SDP_ServiceSearchResponse including a profile list in step B).

Next, the server device 420 can inform that it supports the active profile by including an active profile service record handle to the service support list response message.

Since the client device 410 acquires from the service support list response message that the server device 420 supports the active profile, it can send a service attribute request message SDP_ServiceAttributeRequest including information relating to its required active profile to the server device 420. The server device 420 can acquire the information relating to the generated active profile in a UUID field and an attribute ID of the service attribute request message.

Alternatively, since the client device 410 can acquire from the service support list response message that the server device 420 supports the active profile, it can send a service attribute request message SDP_ServiceAttributeRequest to the server device 420 to request information relating to its required active profile. The server device 420 can include information relating to the suitable active profile for the client device 410 to a UUID field and an attribute ID field and send a response message including the UUID field and the attribute ID field to the client device 410.

As mentioned earlier, the active profile is the executable active profile or the encoded active profile executable after interpretation at each device. According to an embodiment of the present invention, since the information relating to the active profile can be exchanged, compatibility can be maintained.

Next, after determining the necessity of the active profile exchange in step C), the client device 410 exchanges the active profile in step D).

For doing so, the client device 410 requests a connection using the active profile to the service device 420 in step E) and receives a connection response in step E). Next, the client device 410 exchanges the active profile in step G). When the exchange is completed, the client device 410 performs confirmation in step H).

The client device 410 and the server device 420 execute the active profile in step I) and operate according to the active profile in step J).

Figure 5:
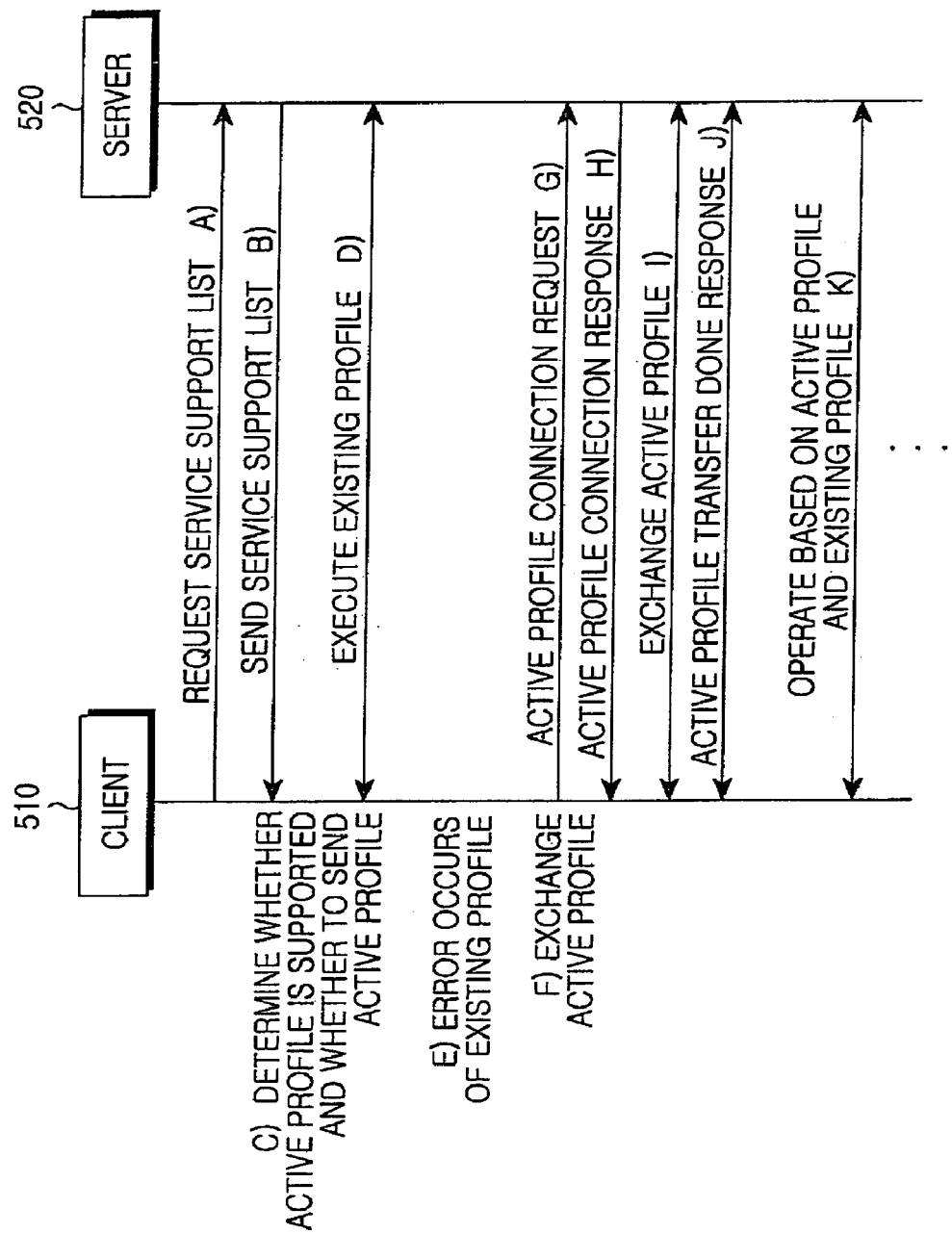
FIG. 5 is a diagram of an active profile exchange procedure according to another exemplary embodiment of the present invention.

FIG. 5 illustrates an active profile exchange procedure according to another exemplary embodiment of the present invention.

In FIG. 5, when a client device 510 sends a service support list request message SDP_ServiceSearchRequest to a server device 520 to request a supportable profile list in step A), the server device 520 sends a service support list response message SDP_ServiceSearchResponse including a profile list in step B).

Next, the server device 520 can inform that it supports the active profile by including an active profile service record handle to the service support list response message.

Since the client device 510 can acquire from the service support list response message that the server device 420 supports the active profile, it can send a service attribute request message SDP_ServiceAttributeRequest including information relating to its required active profile to the server device 520. The server device 520 can acquire the information relating to the generated active profile in a UUID field and an attribute ID field of the service attribute request message.

Alternatively, by acquiring from the service support list response message that the service device 520 supports the active profile, the client device 510 can send a service attribute request message SDP_ServiceAttributeRequest to the server device 520 to request information relating to its required active profile. The server device 520 can include information the suitable active profile information for the client device 510 to a UUID field and an attribute ID field and send a response message including the UUID field and the attribute ID field to the client device 510.

As mentioned earlier, the active profile is the executable active profile or the encoded active profile executable after interpretation at each device. According to another embodiment of the present invention, since information relating to the active profile can be exchanged, the compatibility can be maintained.

Next, when the client device 510 actually requires the active profile exchange but misjudges the unnecessary active profile exchange in step C), an operation based on the existing profile is performed in step D). In doing so, an error occurs in step E).

The client device 510 determines to exchange the active profile in step F) and performs the relevant procedure.

For doing so, the client device 510 requests a connection using the active profile to the server device 520 in step G) and receives a connection response in step H). Next, the client device 510 exchanges the active profile in step I). When the exchange is completed, the client device 510 performs confirmation in step J). The client device 510 and the server device 520 operate according to the active profile in step K).

Figure 6:
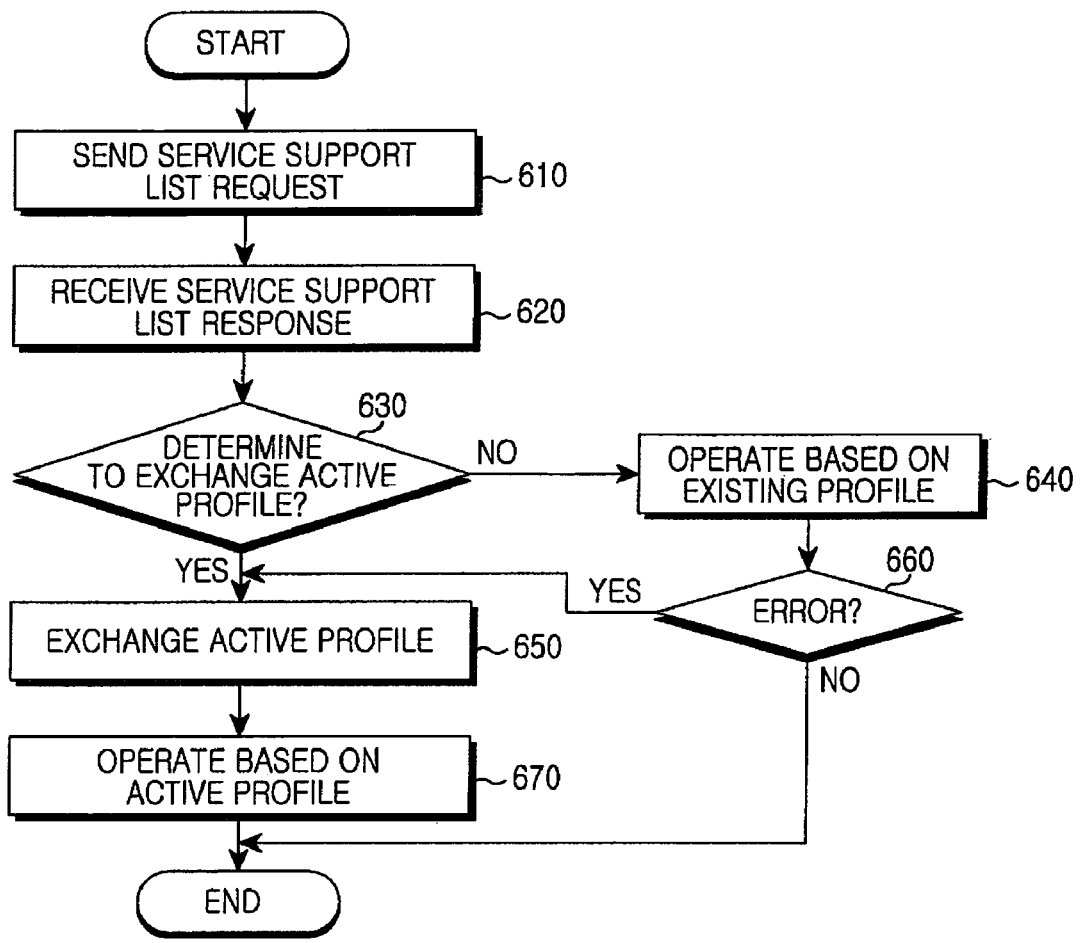
FIG. 6 is a flowchart of an active profile exchange procedure of a Bluetooth client device according to an exemplary embodiment of the present invention.

FIG. 6 is a flowchart of an active profile exchange procedure of a Bluetooth client device according to an exemplary embodiment of the present invention.

The client device in FIG. 6 sends a service support list request message to a server device to request a profile list in step 610. In step 620, the client device receives a service support list response message including the profile list from the server device.

Since the client device can acquire from the service support list response message that the server device supports the active profile, it can send a service attribute request message including information of its required active profile to the server device. The server device can acquire the information of the generated active profile in a UUID field and an attribute ID field of the service attributer request message.

Alternatively, since the client device can acquire from the service support list response message that the server device supports the active profile, it can send a service attribute request message to the server device to request information of its required active profile. In this situation, the server device can include information of the suitable active profile for the client device to a UUID field and an attribute ID field and send a response message including the UUID field and the attribute ID field to the client device.

As mentioned earlier, the active profile is the executable active profile or the encoded active profile executable after interpretation at each device. Since the information relating to the active profile can be exchanged, compatibility can be maintained.

When determining to exchange the active profile in step 630, the client device requests a connection using the active profile to the server device and receives a connection response. Next, the client device performs the active profile exchange procedure in step 650, operates according to the active profile in step 670, and finishes this process.

By contrast, when determining not to exchange the active profile in step 630, the client device operates according to the existing profile in step 640. When an error occurs during the operation based on the existing profile in step 660, the client device determines to exchange the active profile in step 630. For doing so, the client device requests a connection using the active profile to the server device and receives a connection response. Next, the client device exchanges the active profile in step 650, operates according to the active profile in step 670, and then finishes this process.

Figure 7:
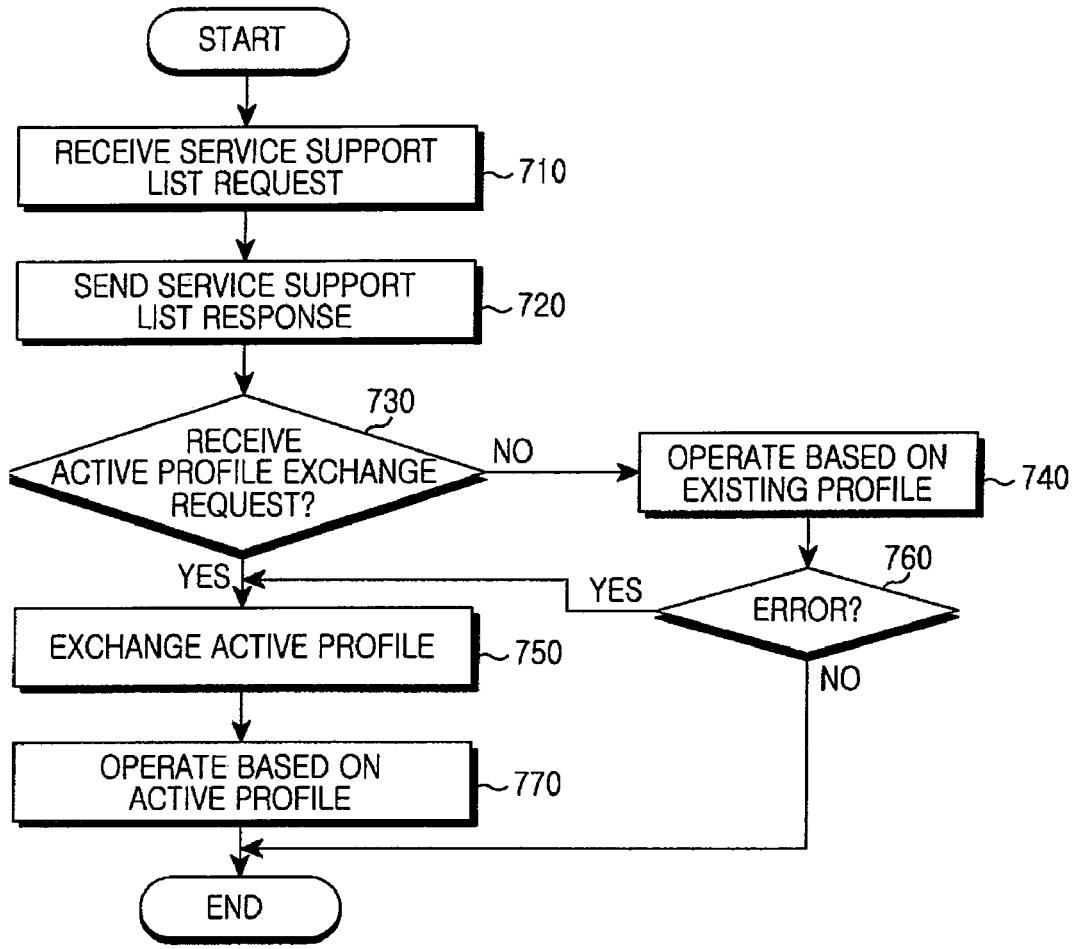
FIG. 7 is a flowchart of an active profile exchange procedure of a Bluetooth server device according to an exemplary embodiment of the present invention.

FIG. 7 is a flowchart of an active profile exchange procedure of a Bluetooth server device according to an exemplary embodiment of the present invention.

The server device receives a service support list request message requesting a profile list from a client device in step 710. In step 720, the server device sends a service support list response message including the profile list to the client device.

The server device can acquire information relating to the active profile generated by the client device in the UUID field and the attribute ID field of the service attribute request message.

Alternatively, the server device can receive the service attribute request message requesting information relating to the active profile required for the client device, include information relating to the active profile suitable for the client device to the UUID field and the attribute ID field, and send a response message including the UUID field and the attribute ID field to the client device.

As described earlier, the active profile is the executable active profile or the encoded active profile executable after interpretation at each device. Since the information relating to the active profile can be exchanged, the compatibility can be maintained.

Upon receiving an active profile exchange request from the client device, the server device sends a response message and exchanges the active profile in step 750.

Next, the server device operates according to the active profile in step 770 and finishes this process.

By contrast, receiving no active profile exchange request from the client device, the server device operates according to the existing profile in step 740. When an operational error occurs because of the existing profile in step 760, the server device receives a connection request using the active profile from the client device and sends a connection response message. The server device exchanges the active profile in step 750.

Next, the server device operates according to the active profile in step 770 and finishes this process.

Figure 8:
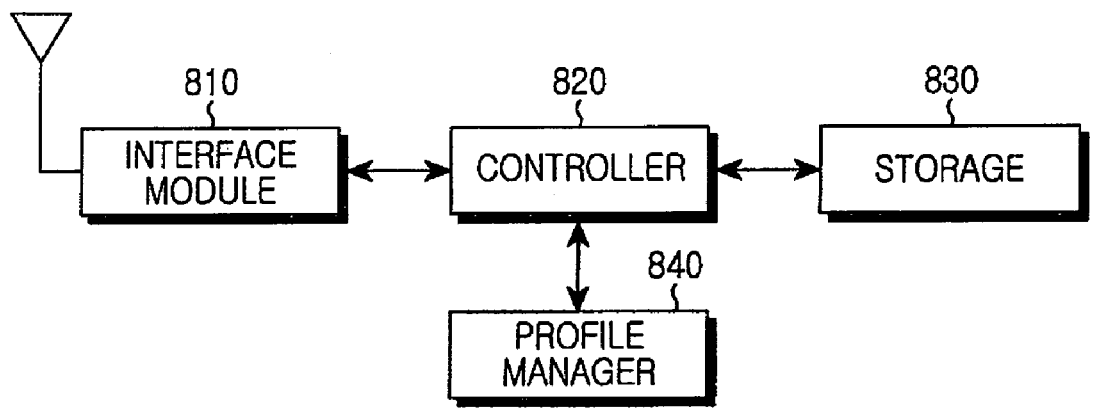
FIG. 8 is a block diagram of the Bluetooth server device and the Bluetooth client device according to an exemplary embodiment of the present invention.

FIG. 8 is a block diagram of the Bluetooth server device and the Bluetooth client device according to an exemplary embodiment of the present invention.

As for the Bluetooth server device of FIG. 8, an interface module 810 includes a radio frequency (RF) processor and a baseband processor to communicate with another node. The RF processor converts a signal received on an antenna to a baseband signal and provides the baseband signal to the baseband processor. The RF processor converts a baseband signal output from the baseband processor to an RF signal to transmit over the air and send the RF signal on the antenna.

A controller 820 controls overall operation of the Bluetooth server device. For example, the controller 820 processes and controls the Bluetooth communications. Besides the general function, the controller 820 provides the received profile information to a profile manager 840 and transmits profile information fed from the profile manager 840 to the other device. The controller 820 controls itself based on the profile interpretation information provided from the profile manager 840.

The profile manager 840 provides its service support list according to the direction and the provided information of the controller 820, generates and provides an active profile suitable for the other device to the controller 820. If necessary, the profile manager 840 interprets the profile received from the other device and provides the interpreted profile to the controller 820.

A storage 830 contains programs for controlling the operations of the device and temporary data generating in the program execution. According to an embodiment of the present invention, the storage 830 stores the profile information.

As constructed above, the controller 820 can function as the profile manager 840. The controller 820 and the profile manager 840 are separately provided to distinguish their function. In the actual product implementation, the controller 820 may process all or part of the functions of the profile manager 840.

As for the Bluetooth client device of FIG. 8, an interface module 810 includes a communication module to communicate with the other node.

A controller 820 controls overall operation of the Bluetooth client device. For example, the controller 820 processes and controls the Bluetooth communications. Besides the general function, the controller 820 provides the received profile information to a profile manager 840 and transmits profile information fed from the profile manager 840 to the other device. The profile manager 840 controls itself based on the profile interpretation information provided from the profile manager 840.

The profile manager 840 requests its service support list according to the direction and the provided information of the controller 820, generates and provides the active profile to the controller 820. If necessary, the profile manager 840 requests the other device to generate and transmit an adequate profile.

A storage 830 contains programs for controlling the operations of the device and temporary data generating in the program executions. According to an embodiment of the present invention, the storage 840 stores the profile information.

As constructed above, the controller 820 can function as the profile manager 840. The controller 820 and the profile manager 840 are separately provided to distinguish their function. In the actual product implementation, the controller 820 may process all or part of the functions of the profile manager 840.

Alternate embodiments of the present invention can also comprise computer readable codes on a computer readable medium. The computer readable medium includes any data storage device that can store data that can be read by a computer system. Examples of a computer readable medium include magnetic storage media (such as ROM, floppy disks, and hard disks, among others), optical recording media (such as CD-ROMs or DVDs), and storage mechanisms such as carrier waves (such as transmission through the Internet). The computer readable medium can also be distributed over network coupled computer systems so that the computer readable code is stored and executed in a distributed fashion. Also, functional programs, codes, and code segments for accomplishing the present invention can be construed by programmers of ordinary skill in the art to which the present invention pertains.

As set forth above, the individual Bluetooth devices can provide their support functions as the active profile, to thus maximize the compatibility between the Bluetooth devices.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for exchanging a profile of a server device in a Bluetooth communication system, the method comprising:
   receiving a request for a service support list from a client device;
   if there is no adequate profile for the client device, generating and transmitting a service support list including information informing that an active profile generation is possible in response to the request;
   after providing the service support list, receiving the active profile generated by the client device when the client device requests an active profile exchange; and
   operating according to the active profile generated by the client device.

2. The method of claim 1, further comprising:
   after providing the service support list, when the active profile exchange is requested, receiving a request for the active profile generation from the client device;
   generating the active profile for the client device and transmitting the generated active profile to the client device; and
   after transmitting the active profile, operating according to the active profile of the client device.

3. The method of claim 1, further comprising:
   after providing the service support list, operating according to an existing profile when the active profile exchange is not requested.

4. The method of claim 1, wherein the active profile is a profile executable by the client device.

5. A method for exchanging a profile of a client device in a Bluetooth communication system, the method comprising:
   requesting a service support list to a server device;
   receiving the service support list from the server device in response to the request;
   requesting an active profile exchange to the server device when the service support list includes information informing that an active profile generation is possible;
   after requesting, generating and transmitting an adequate active profile to the server device; and
   operating according to the adequate active profile.

6. The method of claim 5, further comprising:
requesting the active profile exchange to the server device when the service support list includes the information informing that the active profile generation is possible;
requesting an adequate profile generation to the server device;
receiving the adequate profile from the server device; and
operating according to the received adequate active profile.

7. The method of claim 5, further comprising:
operating according to an existing profile when the service support list does not include the information informing that the active profile generation is possible.

8. The method of claim 5, wherein the active profile is a profile executable by the client device.

9. A server device for exchanging an active profile in a Bluetooth communication system, the server device comprising:
a communication module configured to communicate with another node;
a profile manager configured to receive a request for a service support list from a client device through the communication module, configured to generate and transmit the service support list including information informing that an active profile generation is possible in response to the request when there is no adequate profile for the client device, configured to receive an active profile generated by the client device when the client device requests an active profile exchange, and configured to operate according to the active profile generated by the client device; and
a storage configured to store the active profile.

10. The server device of claim 9, wherein, when the client device requests the active profile generation, the profile manager generates the active profile for the client device, transmits the active profile to the client device, and operates according to the active profile of the client device.

11. The server device of claim 9, wherein the profile manager operates according to an existing profile when the client device does not request the active profile exchange.

12. The server device of claim 9, wherein the active profile is a profile executable by the client device.

13. A client device for exchanging an active profile in a Bluetooth communication system, the client device comprising:
a communication module configured to communicate with another node;
a profile manager configured to request a service support list from a server device through the communication module, receiving a response of the request, configured to request an active profile exchange to the server device when the received service support list includes information informing that an active profile generation is possible when there is no adequate profile for the client device at the server device, configured to generate and transmit an adequate active profile to the server device, and configured to operate according to the adequate active profile; and
a storage configured to store the active profile.

14. The client device of claim 13, wherein the profile manager requests the active profile exchange to the server device when the service support list includes the information informing that the active profile generation is possible, requests the server device to generate an adequate active profile, receives the adequate active profile from the server device, and operates according to the received adequate active profile.

15. The client device of claim 13, wherein the profile manager operates according to an existing profile when the service support list does not include the information informing that the active profile generation is possible.

16. The client device of claim 13, wherein the active profile is a profile executable by the client device.

17. A system for exchanging an active profile in a Bluetooth communication system, the system comprising:
a client device configured to request a service support list, configured to receive a response to the request, configured to request an active profile exchange and generate and transmit an adequate active profile when the received service support list includes information informing that an active profile generation is possible, and configured to operate according to the adequate active profile; and
a server device for receiving configured to receive the request for the service support list from the client device, configured to generate and transmit the service support list including information informing that an active profile generation is possible in response to the request when there is no adequate profile for the client device, configured to receive the active profile generated by the client device when the client device requests the active profile exchange, and configured to operate according to the active profile generated by the client device.

18. The system of claim 17, wherein, when the client device requests the active profile generation, the server device generates the active profile for the client device, transmits the generated active profile to the client device, and operates according to the active profile of the client device.

19. The system of claim 17, wherein the server device operates according to an existing profile when the client device does not request the active profile exchange.

20. The system of claim 17, wherein the client device requests the active profile exchange to the server device when the service support list includes the information informing that the active profile generation is possible, requests the server device to generate an adequate active profile, receives the adequate active profile from the server device, and operates according to the received active profile.

21. The system of claim 17, wherein the client device operates according to an existing profile when the service support list does not include the information informing that the active profile generation is possible.

22. The system of claim 17, wherein the active profile is a profile executable by the client device.

23. A non-transitory, computer-readable recording medium having recorded thereon a program for exchanging a profile of a server device in a Bluetooth communication system, comprising;
a first code segment configured to receive a request for a service support list from a client device;
a second code segment configured to generate and transmit a service support list including information informing that an active profile generation is possible in response to the request, if there is no adequate profile for the client device;
a third code segment configured to receive the active profile generated by the client device when the client device requests an active profile exchange, after providing the service support list; and,
a fourth code segment configured to operate according to the active profile generated by the client device.

24. A non-transitory, computer-readable recording medium having recorded thereon a program for exchanging a profile of a client device in a Bluetooth communication system, comprising;

a first code segment configured to request a service support list from a server device;

a second code segment configured to receive the service support list from the server device in response to the request;

a third code segment configured to request an active profile exchange from the server device when the service support list includes information informing that an active profile generation is possible when there is no adequate profile for the client device at the server device;

a fourth code segment configured to generate and transmit an adequate active profile to the server device after requesting the active profile exchange; and a fifth code segment configured to operate according to the adequate active profile.

* * * * *